United States Patent [19]
Kopitzke

[11] Patent Number: 5,516,146
[45] Date of Patent: May 14, 1996

[54] FASTENERLESS AIRBAG MOUNTING

[75] Inventor: Daniel F. Kopitzke, Rochester, Mich.

[73] Assignee: AlliedSignal Inc., Morristown, N.J.

[21] Appl. No.: 346,963

[22] Filed: Nov. 30, 1994

[51] Int. Cl.[6] .................................................. B60R 21/16
[52] U.S. Cl. ............................... 280/728.2; 280/743.1
[58] Field of Search ...................... 280/743 R, 743 A, 280/732, 728 A, 729, 739, 740, 743.1, 743.2, 728.2

[56] References Cited

U.S. PATENT DOCUMENTS

| 3,784,225 | 1/1974 | Fleck et al. | 280/729 |
|---|---|---|---|
| 3,788,665 | 1/1974 | Noll et al. | 280/729 |
| 3,792,873 | 2/1974 | Buchner et al. | 280/743 R |
| 3,799,575 | 3/1974 | Kurze et al. | 280/743 |
| 3,827,715 | 8/1974 | Lynch | 280/741 |
| 3,887,213 | 6/1975 | Goetz | 280/739 |
| 4,006,918 | 2/1977 | MacFarland | 280/743.1 |
| 4,153,273 | 5/1979 | Risko | 280/732 |
| 4,836,576 | 6/1989 | Werner et al. | 280/728 B |
| 5,004,266 | 4/1991 | Miller | 280/743 A |
| 5,078,423 | 1/1992 | Fujita | 280/743 A |

FOREIGN PATENT DOCUMENTS

| 4-100753 | 4/1992 | Japan | 280/743 R |
|---|---|---|---|
| 4-163252 | 6/1992 | Japan | 280/743.1 |

Primary Examiner—Karin L. Tyson
Attorney, Agent, or Firm—Markell Seitzman

[57] ABSTRACT

An air bag (20) having a face portion (22) and a rear portion (24) generally opposite the face portion which define a cushion inflatable in response to inflation gas. The rear portion is closed with the exception of two inflator receiving openings (28a,b) for receipt of an inflator (50). The body of the inflator is received through both openings.

2 Claims, 3 Drawing Sheets 5,516,146

FASTENERLESS AIRBAG MOUNTING

BACKGROUND AND SUMMARY OF THE INVENTION

The present invention generally relates to air bags and modules therefor.

Air bags and particularly those used for driver side modules include a face panel joined to a rear panel. The rear panel includes a single central opening for receipt of a portion of a cylindrically-shaped inflator having a small length/diameter (l/d) ratio. Such an air bag will not accommodate an inflator of the type described below. It is an object of the present invention to provide an air bag, and associated module, for a cylindrically shaped inflator in which its length is substantially greater than its diameter.

Accordingly, the invention comprises: an air bag material defining a cushion, inflatable in response to inflation gas, including a face panel and a rear panel generally opposite the face portion. The rear panel is closed with the exception an inflator receiving first means comprising two spaced openings of sufficient size to receive a narrow inflator. The inflator includes end flanges which assist in preventing the air bag from slipping off the inflator and positions the inflator in the openings. The air bag may include a tether to restrict the inflated shape of the air bag. The folded air bag and inflator are positioned in a housing and protected by a tearable cover. In a second embodiment of the invention a heat shield is used to protect the air bag from the products of combustion created upon activation of the inflator.

Many other objects and purposes of the invention will be clear from the following detailed description of the drawings.

DETAILED DESCRIPTION OF THE DRAWINGS

Figure 1:
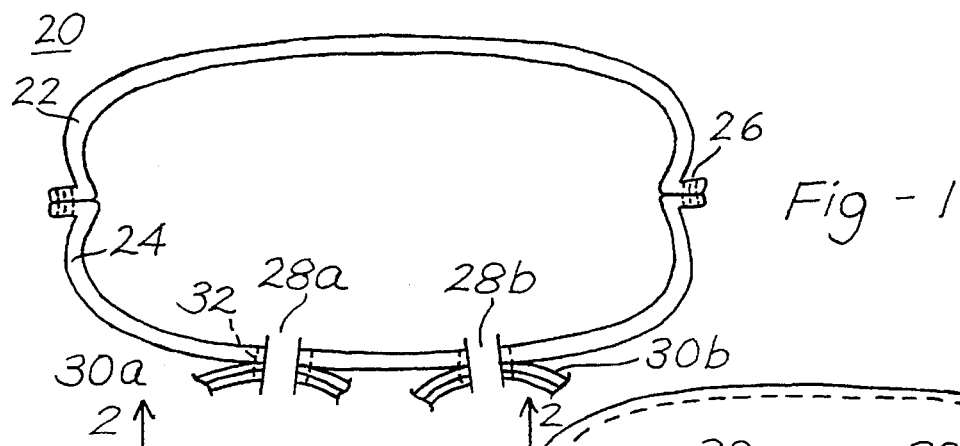
FIG. 1 shows a cross-sectional view of a driver side air bag made according to the present invention.
Figure 2:
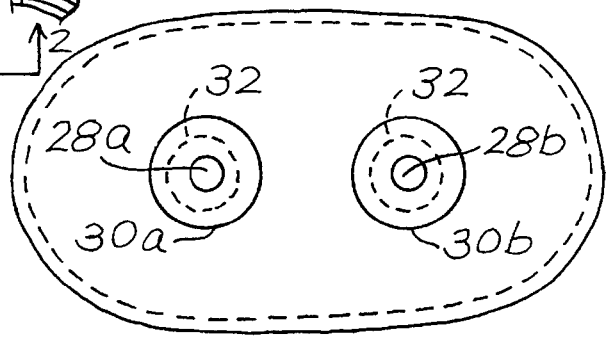
FIG. 2 is a plan view along section lines 2—2.
Figure 3:
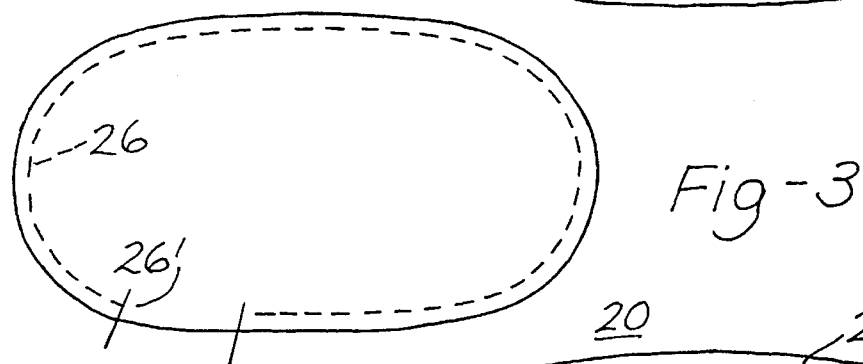
FIG. 3 is a top plan view of the air bag of FIG. 1.
Figure 4:
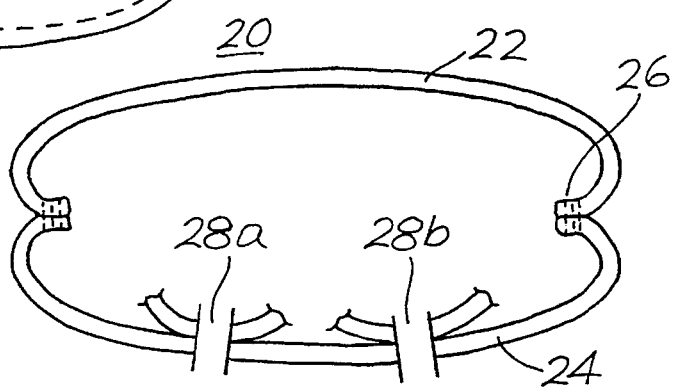
FIG. 4 is a cross-sectional view of the air bag of FIG. 1 turned inside out.
Figure 5:
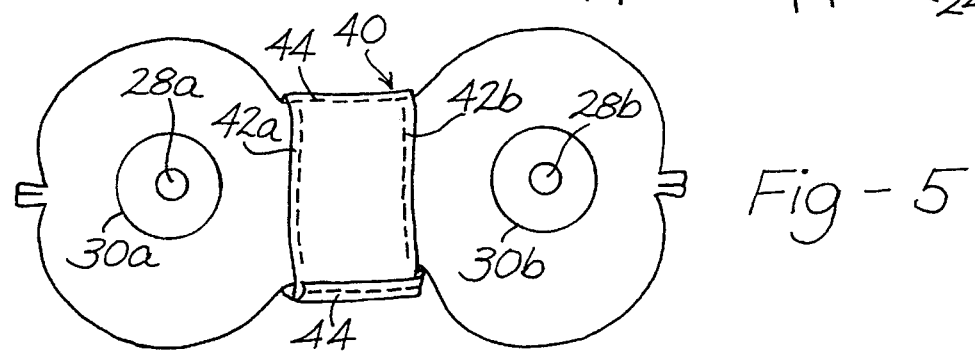
FIGS. 5 and 6 show a tether secured about the air bag of FIG. 1.
Figure 6:
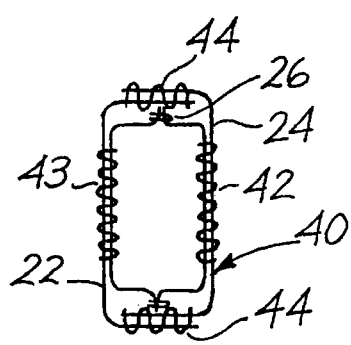

FIG. 1 shows an air bag 20 having a face panel 22 and rear panel 24 joined at a mating peripheral edge by a sew seam 26. In the preferred embodiment of the invention the air bag 20 is a driver side air bag, however, the invention is applicable to other air bags such as those used on the passenger side or for side impact protection. The panels are typically constructed of a woven fabric, typically nylon or polyester. The rear panel includes a plurality of spaced openings 28a and 28b. Secured about each opening 28a and 28b is at least one ring, or layer, of air bag material 30a and 30b which reinforces the rear panel. FIG. 2 is a plan view showing the openings and reinforcements 30a and 30b. As can be seen the reinforcing rings are secured to the rear panel by an additional sew seam 32. The air bag may be used in this configuration or alternatively reversed inside out to obtain the configuration shown in FIG. 4. To achieve the configuration of FIG. 4, the face panel 22 and rear panel 24 can be reversed by pulling the panels through one of the openings 28a or 28b. Alternatively, the sew seam 26 can be made with a small unsewn portion 26' of the panels providing a larger peripheral opening through which the panels can be reversed. Thereafter this open section 26' is sewn closed. As is known in the art, when an air bag is inflated the front panel is propelled toward the occupant. To prohibit this movement tethers such as 40 can be employed. FIGS. 5 and 6 show one tether 40 secured about the air bag of FIG. 1. The tether 40, a band of woven air bag material, is secured to the front and rear panels such as along a sew seams 42 and 43. FIG. 5 shows the attachment to the rear panel 24. A similar attachment is used for the face panel. The tether may comprise one or more pieces formed into a band or loop and joined at sew seam(s) 44. Upon inflation of the air bag, the tether restricts the forward extension of the face panel and permits the air bag to expand radially. The tether may be formed of a breakable band of material.

Figure 7:
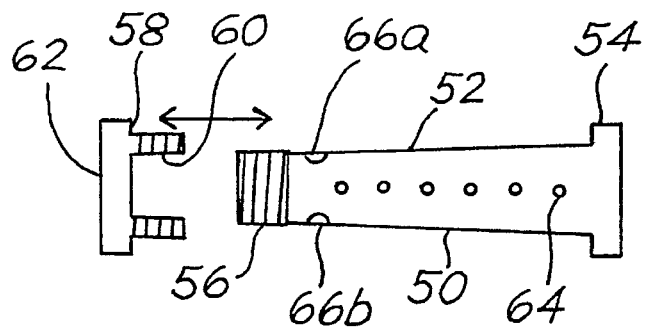
FIG. 7 shows a plan view of a cylindrically shaped inflator.
Figure 8:
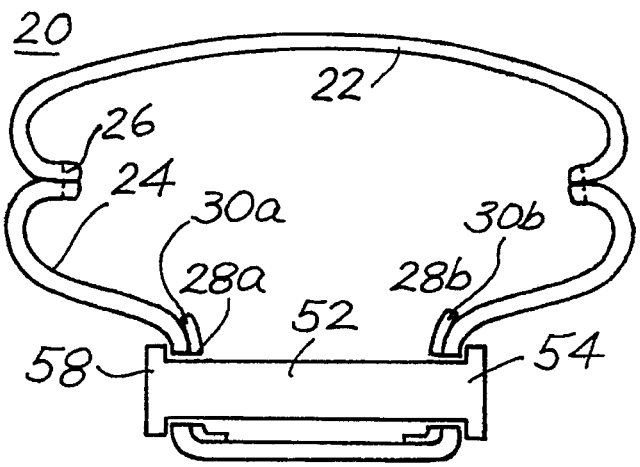
FIG. 8 shows the inflator received in the air bag.
Figure 9:
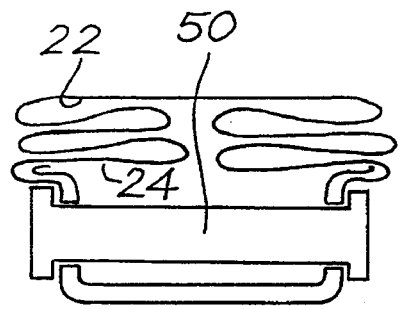
FIG. 9 shows the air bag folded about the inflator.

Reference is briefly made to FIG. 7 which illustrates a gas generator or inflator 50 that may be used in the present invention. This gas generator includes a narrow, relatively long body 52 having an end flange 54. The body, at its left side, includes a fastening feature such as a plurality of threads 56. Alternate fastening features such as a bayonet mount would suffice. The inflator includes an end nut 58 having a mating fastening feature such as internal threads 60 as well as a flange 62. While shown spaced apart from the body 52, the end nut 58 is threaded upon the threads 56 during assembly to the air bag. It should be appreciated that the inflator 50 shown in FIG. 7 can be filled with a solid propellant such as sodium azide in which case the body 52 would include a plurality of openings or exit ports 64 through which the inflation gas, generated upon burning of the sodium azide exits the inflator. Alternatively, the inflator 50 may be of the hybrid inflator variety. As is known in the art, the body 52 of a hybrid inflation forms a pressure vessel in which an inert, pressurized gas such as a combination of Argon and Helium is placed. The pressure vessel is closed by a breakable disk which is ruptured during inflation. The means by which the disk is ruptured is not important to the present invention. As is also known in the an, hybrid inflators include a small number, typically one or two, of openings 66a and 66b located near one end of the pressure vessel through which the inflation gas exits the inflator. FIG. 8 illustrates the air bag 20 of FIG. 4 with the rear panel bent such that the openings 28a and 28b are aligned. It should be appreciated that the air bag of FIG. 1 could also be used. With the air bag in this configuration, the body 52 of the inflator 50 is slipped into opening 28a and out through opening 28b. The nut 58 is then secured to the body 54 achieving the configuration shown in FIG. 8. Thereafter the air bag is folded into a compact configuration. As can be appreciated the air bag can be folded about the inflator 50 as shown in FIG. 9 and then placed within a housing or, alternatively, the air bag can be folded after the inflator and unfolded air bag are placed in the housing.

Figure 10:
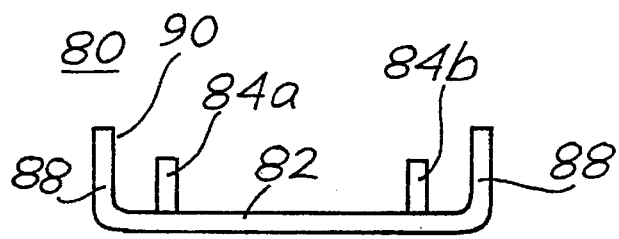
FIGS. 10–12 show various views of a housing/module.
Figure 11:
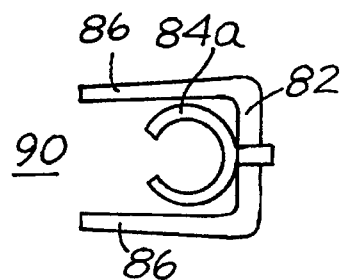
Figure 12:
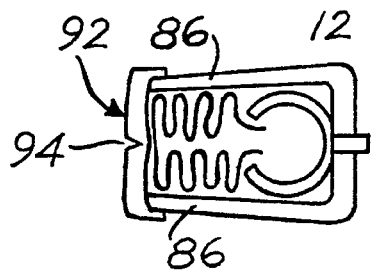
Figure 13:
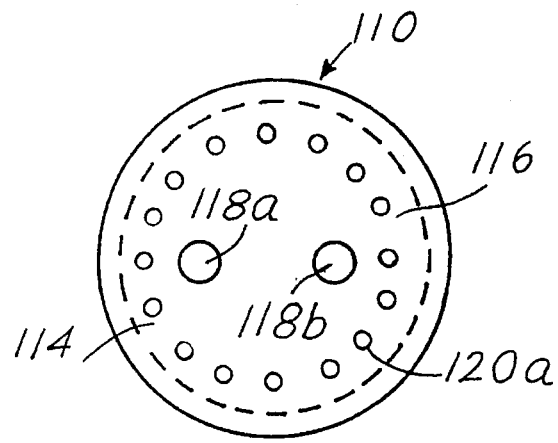
FIGS. 13–16 illustrate an alternate embodiment of the invention.
Figure 14:
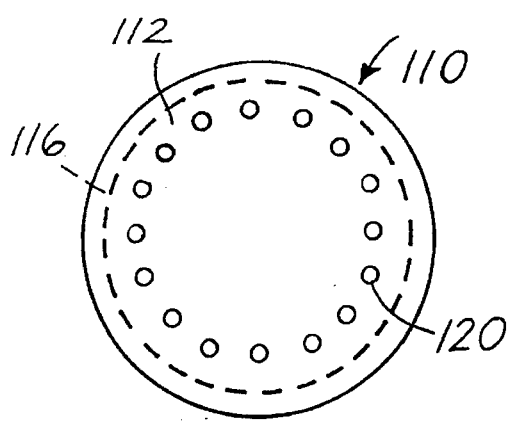
Figure 15:
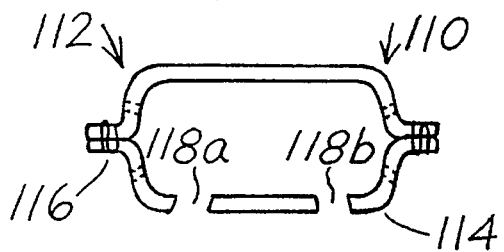
Figure 16:
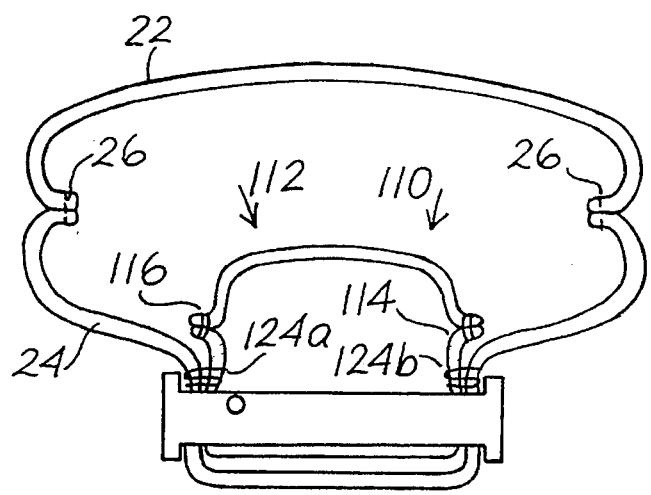

Reference is made to FIGS. 10 through 12. FIG. 10 is a cross-sectional view of a housing 80 used to support the air bag and inflator. The housing may be metal, plastic or a combination which will depend upon how it is to mounted into the vehicle. The housing includes a rear wall 82 supporting a plurality of clamps such as flexible, C-shaped clamps or holding members 84a and 84b. One such clamp 84a is shown in side view of FIG. 11. The housing includes side walls 86 and end walls 88. The various side and end walls 86 and 88 define an opening 90 through which the air bag expands when inflated. The housing, as shown in FIG. 12, may include a synthetic cover generally shown as 92 secured to the side walls 86 by any convenient means known in the art. The cover 92 may include a weakened portion 94 that defines a preferred tear seam or tear region about which the cover opens or tears apart in response to the force of the outwardly expanding air bag 20.

With reference to FIG. 12, the unfolded air bag and inflator could be inserted within the housing 80 with the clamps 84a and 84b clasping the body 54 of the inflator (as well as that portion of the rear panel enveloping the body), to secure the inflator to the housing 88. The panels 22 and 24 of the air bag are folded to achieve the configuration shown in FIG. 12. Thereafter the cover 90 is secured to the housing 88.

Reference is made to FIGS. 13 through 16 which show an alternate embodiment of the invention. This embodiment uses a heat shield 110 formed as a sack by joining two generally circular pieces 112 and 114 of fabric together at a circumferential sew seam 116. The heat shield can be other shapes. In the context of a driver side air bag the preferred shape is circular because of the generally circular shape of the driver side air bag. The fabric used as the heat shield is woven and coated on one side (receiving the heated inflation gas) with a heat resistant material such as neoprene or silicone. One of the pieces such as 114 includes two openings 118a and 118b of the same or similar size and spacing as openings 28a and 28b. At least one of the pieces of the heat shield such as piece 112 includes a plurality of small openings 120 which serve to distribute or diffuse the heated inflation gas into the air bag. The heat shield captures the inflation gas and the openings 120 tend to make the gas flow into the air bag more uniform. Piece 114 may also include another plurality of openings 120a. The choice of whether or not to include small openings on one or both pieces of the heat shield depends upon the desired flow path of the inflation gas as it exits the heat shield and flows into the air bag 20. Flow path considerations may be more important when used with a hybrid inflation as the inflator gas exits from one side of the inflator 50. The heat shield is joined to the rear panel 24 by a sew seam 124a and 124b with the openings 118 and 28 aligned to receive the inflator 50.

Many changes and modifications in the above-described embodiment of the invention can, of course, be carried out without departing from the scope thereof. Accordingly, that scope is intended to be limited only by the scope of the appended claims.

I claim:

1. A device (20) comprising:

a cushion inflatable in response to inflation gas, having a flexible face portion (22) and a flexible rear portion (24) generally opposite the face portion, the rear portion including an inflator receiving first means comprising two, spaced openings (28a,b) of sufficient size to receive an inflator (50), the openings initially oriented on the rear portion such that an axis through the center of each opening extends away from the rear portion and when in an inflator receiving position the rear portion is bendable such that the openings are facing one another;

an inflator and a housing (80) including at least one c-shaped clamp radially received about the inflator with a portion of the cushion received between the inflator and the clamp for holding the inflator and cushion.

2. The device as defined in claim 1 including a breakable cover (92) secured to the housing to protect the cushion and inflator when closed.

* * * * *